(12) United States Patent
Chang et al.

(10) Patent No.: US 9,902,145 B2
(45) Date of Patent: Feb. 27, 2018

(54) ADJUSTABLE PRINTING-HEIGHT THREE-DIMENSIONAL PRINTER

(71) Applicants: Inventec Appliances (Pudong) Corporation, Shanghai (CN); Inventec Appliances (Shanghai) Co., Ltd., Shanghai (CN); Inventec Appliances Corp., New Taipei (TW)

(72) Inventors: Jing-Song Chang, New Taipei (TW); Shen Zhang, Shanghai (CN); Xu-Jun Qiu, Shanghai (CN); Yu Zhang, Shanghai (CN)

(73) Assignees: Inventec Appliances (Pudong) Corporation, Shanghai (CN); Inventec Appliances (Shanghai) Co., Ltd., Shanghai (CN); Inventec Appliances Corp., New Taipei (TW)

( * ) Notice: Subject to any disclaimer, the term of this patent is extended or adjusted under 35 U.S.C. 154(b) by 105 days.

(21) Appl. No.: 14/825,189

(22) Filed: Aug. 13, 2015

(65) Prior Publication Data

US 2016/0303801 A1    Oct. 20, 2016

(30) Foreign Application Priority Data

Apr. 16, 2015   (CN) .......................... 2015 1 0181182

(51) Int. Cl.
*B33Y 30/00* (2015.01)
*B29C 64/20* (2017.01)
*B29C 64/106* (2017.01)

(52) U.S. Cl.
CPC ............ *B33Y 30/00* (2014.12); *B29C 64/106* (2017.08); *B29C 64/20* (2017.08)

(58) Field of Classification Search
USPC ......................................................... 425/375
See application file for complete search history.

(56) References Cited

U.S. PATENT DOCUMENTS

| | | | |
|---|---|---|---|
| 7,942,987 B2 * | 5/2011 | Crump ................. | B22F 3/1055 148/516 |
| 2016/0046081 A1 * | 2/2016 | Kim ..................... | B29C 47/0014 425/143 |
| 2016/0052207 A1 * | 2/2016 | Bloom ................. | B29C 67/0085 425/3 |
| 2016/0144564 A1 * | 5/2016 | Padgett ............... | B29C 67/0055 425/113 |

FOREIGN PATENT DOCUMENTS

CN      203357902 U   * 12/2013
CN      204036850 U   * 12/2014

* cited by examiner

*Primary Examiner* — Jacob T Minskey
*Assistant Examiner* — Baileigh Kate Darnell
(74) *Attorney, Agent, or Firm* — CKC & Partners Co., Ltd.

(57) ABSTRACT

An adjustable printing-height three-dimensional printer includes a base, an elevating module, a working platform, a nozzle bracket, a printing nozzle, and a driver. The elevating module is disposed on the base. The working platform is located proximal to the base. The nozzle bracket is operably engaged with the first elevating module. The printing nozzle is operably engaged with the nozzle bracket and is configured to print on the working platform. The driver is configured to drive the elevating module to move the nozzle bracket along an axial direction, so as to make the printing nozzle to move toward or away from the working platform.

10 Claims, 4 Drawing Sheets

ADJUSTABLE PRINTING-HEIGHT THREE-DIMENSIONAL PRINTER

RELATED APPLICATIONS

This application claims priority to Chinese Application Serial Number no. 201510181182.1, filed Apr. 16, 2015, which is herein incorporated by reference.

BACKGROUND

Technical Field

The present disclosure relates to a three-dimensional printer.

Description of Related Art

Rapid prototyping (RP) technology is a next industry-focused technology after the CNC machining technology. The RP technology can rapidly produce a prototype in view of a three-dimensional (3D) object model of computer-aided design (CAD) by using a 3D printing mechanism at less expensive cost. The principle of the RP technology is first to divide the 3D object model of CAD into multiple slices, and, after the slices of the 3D object model is processed and transformed to the sectional configuration information, the object to be formed is stacked layer-by-layer by the 3D printing mechanism based on the sectional configuration information with no aid of any instruments. Therefore, the RP technology has great potential.

A typical printing head structure of a three-dimensional printer mainly includes a feed inlet, a feed motor, a guide tube, a heating element, and a nozzle. Most of these parts are made of thermoplastic molding materials. The raw materials for molding that are solid at room temperature are pushed into the heating element via the guide tube by the feed motor, and the solid raw materials are melt by the heating element and then are gradually stacked into a 3D object by the nozzle.

In general, when carrying out the 3D printing, the scale in the vertical direction is even more important than that in the horizontal direction. However, concerning the conventional 3D printers for either Cartesian structures (with the nozzle moving in the X and Y axes and the working platform moving in the Z axis) or parallel arm structures (mapping the XYZ coordinates to three moving shafts perpendicular to each other by trigonometric functions), they usually require large z-directional dimensions (i.e., machine heights), but exhibit relatively small effective print heights. Further, the conventional three-dimensional printers have no way to go beyond the height limitations of the machine heights in the 3D printing.

SUMMARY

In view of the foregoing problem, the present disclosure provides an adjustable printing-height three-dimensional printer.

According to an embodiment, the disclosure provides an adjustable printing-height three-dimensional printer. The adjustable printing-height three-dimensional printer includes a base, a first elevating module, a working platform, a nozzle bracket, a printing nozzle, and a first driver. The first elevating module is disposed on the base. The working platform is located proximal to the base. The nozzle bracket is operably engaged with the first elevating module, for example being connected, attached, or affixed to the first elevating module. The printing nozzle is operably engaged with the nozzle bracket, for example being connected to the nozzle bracket or being held by the nozzle bracket. The printing nozzle is configured to print on the working platform. The first driver is configured to drive the first elevating module to move the nozzle bracket along a first axial direction, so as to make the printing nozzle move toward or away from the working platform.

In an embodiment of the disclosure, the first driver is disposed on the base. The first elevating module includes a first guide rod and a first screw rod. The first guide rod is disposed on the base and slidably engaged with the nozzle bracket. The first guide rod extends along the first axial direction. The first screw rod is disposed on the base and engages with the nozzle bracket in a screw arrangement. For example, the first screw rod may have a spiral groove coupling with a counterpart located on the nozzle bracket. The first driver drives the first screw rod to rotate, so as to move the nozzle bracket along the first axial direction.

In an embodiment of the disclosure, the adjustable printing-height three-dimensional printer further includes a second elevating module and a second driver. The second elevating module is disposed on the base and operably engaged with the working platform, for example being connected or affixed or locked to the working platform. The working platform may separate from the base and the second elevating module engages the working platform such that it allows the second elevating module to cause or control movement of the working platform. The second driver is configured to drive the second elevating module to move the working platform between the base and the printing nozzle along the first axial direction.

In an embodiment of the disclosure, the second elevating module includes a second guide rod and a second screw rod. The second guide rod is disposed on the base and slidably engaged with the working platform. The second guide rod extends along generally parallel to the first axial direction. The second screw rod is disposed on the base and is engaged in a screw arrangement with the working platform. For example, the second screw rod may have a spiral groove coupling with a counterpart located on the working platform. The second driver drives the second screw rod to rotate, so as to move the working platform along the first axial direction.

In an embodiment of the disclosure, the second elevating module further includes a spacer. The second guide rod is operably engaged with the spacer, and the first driver is disposed on the spacer.

In an embodiment of the disclosure, the first screw rod extends away from the base to a side of the spacer. The second screw rod extends between the base and the spacer.

In an embodiment of the disclosure, the adjustable printing-height three-dimensional printer further includes a two-dimensional moving module. The two-dimensional moving module is operably engaged with the nozzle bracket and the printing nozzle. For example, the two-dimensional moving module may support or hold the printing nozzle in a connected or detachable arrangement. The two-dimensional moving module is configured to move the printing nozzle relative to the nozzle bracket along a second axial direction and/or a third axial direction.

In an embodiment of the disclosure, the two-dimensional moving module includes a first rail and a second rail. The first rail is operably engaged with the nozzle bracket and extends along the second axial direction. In one form, the first rail may be affixed or connected to the nozzle bracket. Alternatively, the first rail and the nozzle bracket may be in a locking arrangement and may be detached. The second rail is slidably disposed on the first rail and extends along the third axial direction. The printing nozzle may be affixed or slidably disposed on the second rail.

In an embodiment of the disclosure, the two-dimensional moving module further includes a first transmission member, a first motor, a second transmission member, and a second motor. The first transmission member is operably engaged with the second rail, for example being connected or detachably coupled with the second rail. The first motor is disposed on the first rail and configured to drive the first transmission member to move the second rail relative to the first rail generally along the second axial direction. The second transmission member is operably engaged with the printing nozzle, for example being connected or detachably coupled with the printing nozzle. The second motor is disposed on the second rail and configured to drive the second transmission member to move the printing nozzle relative to the second rail generally along the third axial direction.

In an embodiment of the disclosure, the first transmission member and the second transmission member are transmission belts. Alternatively, the first and second transmission members may be mechanical components or mechanical arrangements allowing for movement, as are known to a skilled person in the art.

In an embodiment of the disclosure, any two of the first axial direction, the second axial direction, and the third axial direction are generally orthogonal or perpendicular to each other. The adjustable printing-height three-dimensional printer of the disclosure can adjust the printable height range thereof according to actual heights of objects to be printed. When there is no object to be printed, or the size of the height of the object to be printed is small, the adjustable printing-height three-dimensional printer of the disclosure, by actuating the first elevating module, can move the nozzle bracket to its smallest height parameter setting, so that the adjustable printing-height three-dimensional printer occupies less space. For larger objects to be printed, the adjustable printing-height three-dimensional printer of the disclosure can, using the first elevating module, move the nozzle bracket from the lowest height to its upper height limit, so as to increase the operational height range between the printing nozzle and the working platform.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
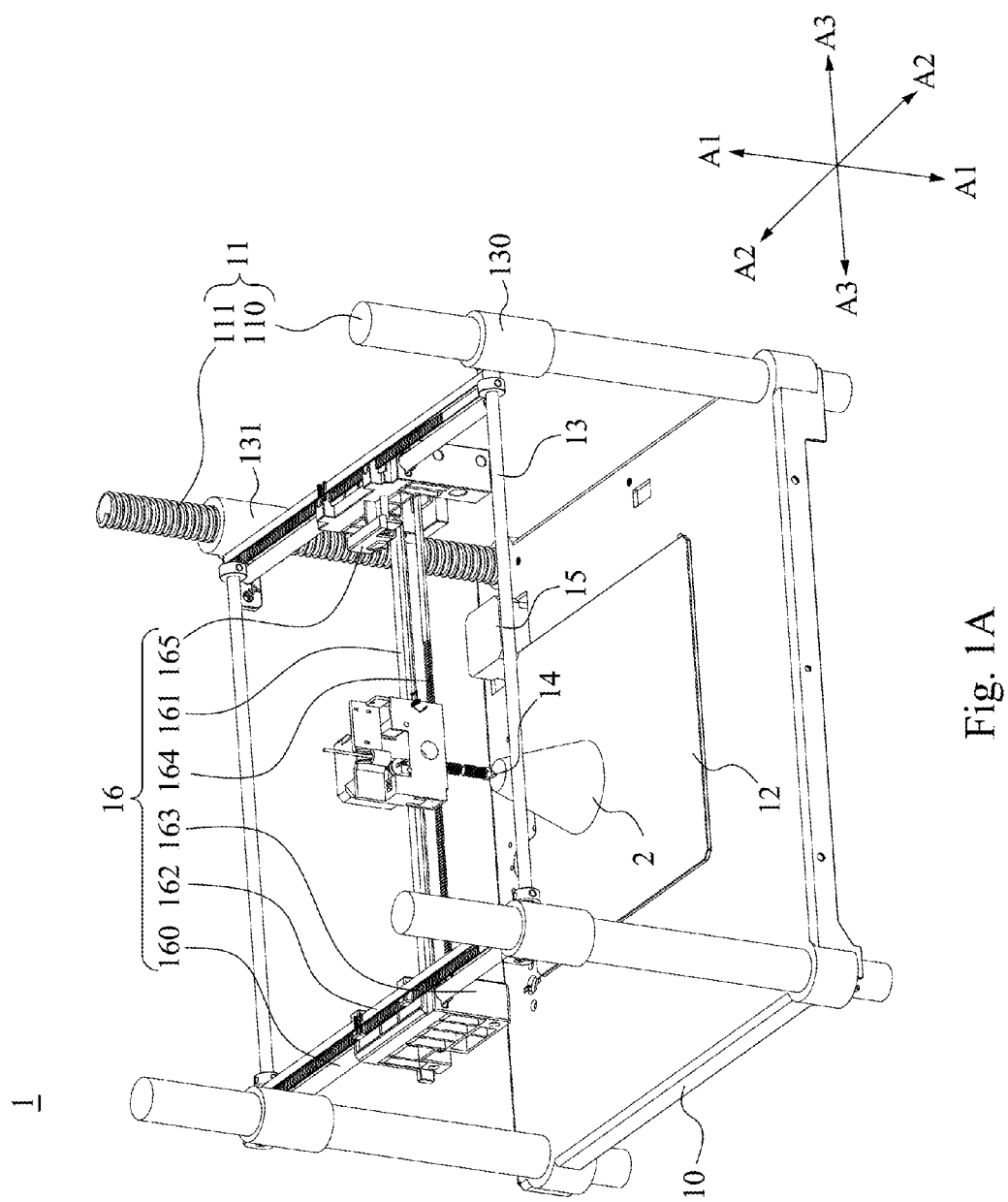
FIG. 1A is a perspective view of an adjustable printing-height three-dimensional printer according to an embodiment of the disclosure.
Figure 1B:
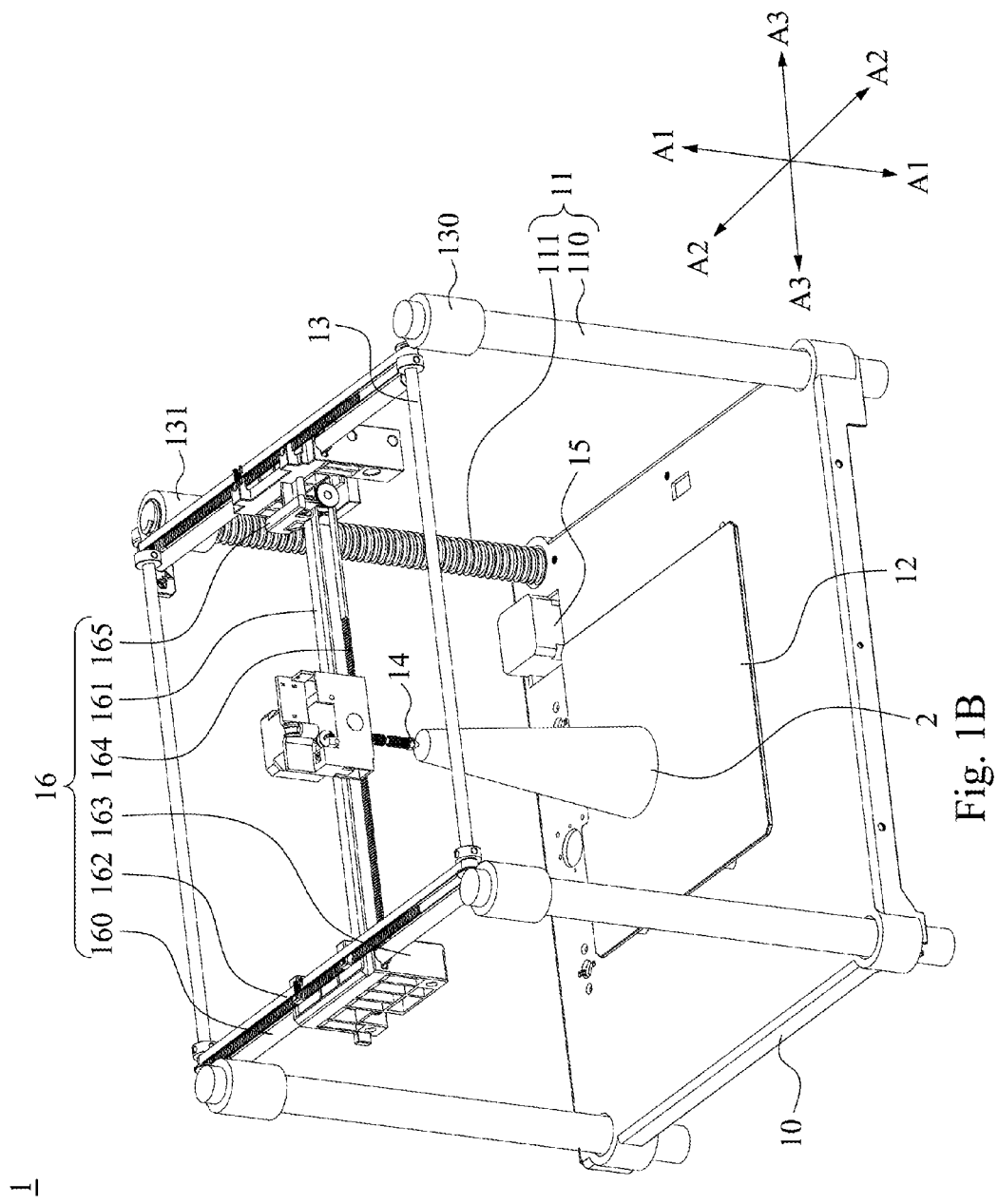
FIG. 1B is another perspective view of the adjustable printing-height three-dimensional printer in FIG. 1A.

Reference will now be made in detail to the present embodiments of the disclosure, examples of which are illustrated in the accompanying drawings. Wherever possible, the same reference numbers are used in the drawings and the description to refer to the same or like parts. Referring to FIG. 1A and FIG. 1B, in the embodiment, the adjustable printing-height three-dimensional printer 1 includes a base 10, a first elevating module 11, a working platform 12, a nozzle bracket 13, a printing nozzle 14, and a first driver 15. The first elevating module 11 is disposed on the base 10. The working platform 12 is located on the base 10. The nozzle bracket 13 is operably engaged with the first elevating module, for example being connected, attached, or affixed to the first elevating module 11. The printing nozzle 14 is operably engaged with the nozzle bracket, for example being connected to the nozzle bracket 13 or being held by the nozzle bracket. The printing nozzle 14 is configured to print on the working platform 12. The first driver 15 is configured to drive the first elevating module 11 to move the nozzle bracket 13 along a first axial direction A1 (up or down), so as to make the printing nozzle 14 move towards or away from the working platform 12. More detailed structures, operating principles of the foregoing components, and the specific connection relationships among the components of the adjustable printing-height three-dimensional printer 1 are further described below.

In the embodiment, the first driver 15 is disposed on the base 10. The first elevating module 11 includes a first guide rod 110 and a first screw rod 111. The first guide rod 110 is disposed on the base 10 and slidably engaged with the nozzle bracket 13. The first guide rod 110 functions as a guiding pillar and extends generally along the first axial direction A1 vertical from the base 10. The first screw rod 111 is disposed on the base 10 and engages in a screw arrangement with the nozzle bracket 13. Specifically, the nozzle bracket 13 includes a sliding sleeve 130 and a screw sleeve 131. The first guide rod 110 is sleeved by the sliding sleeve 130, and the first screw rod 111 is in a screw arrangement with the screw sleeve 131. As can be seen from the figure, the screw rod 111 has a helical/spiral groove which couples with a counterpart located on the inner side of the screw sleeve 131. Therefore, the first driver 15 can drive the first screw rod 111 to rotate, so as to move the nozzle bracket 13 to a desired height (as shown in FIG. 1A) between its uppermost height position (as shown in FIG. 1B) and its lowest height position along the first axial direction A1.

In the embodiment, the adjustable printing-height three-dimensional printer 1 includes three guide rods 110 and a first screw rod 111, but the disclosure is not limited in this regard. In some embodiments, the adjustable printing-height three-dimensional printer 1 can include four drivers for respectively driving four screw rods 111, which may provide improved control of the horizontal level of the nozzle bracket 13 while raising or lowering.

In addition, the adjustable printing-height three-dimensional printer 1 further includes a two-dimensional moving module 16. The two-dimensional moving module 16 is operably engaged with the nozzle bracket 13 and supports the printing nozzle 14. Shown in this embodiment, the printing nozzle 14 is attached to the two-dimensional moving module 16. The two-dimensional moving module 16 is configured to move the printing nozzle 14 relative to the nozzle bracket 13 along a second axial direction A2 and a third axial direction A3. The second axial direction A2 and third axial direction A3 covers a plane space defining printing width and depth. In the embodiment, any two of the first axial direction A1, the second axial direction A2, and the third axial direction A3 are generally orthogonal or perpendicular to each other, but the disclosure is not limited in this regard. In practical applications, the second axial direction A2 and the third axial direction A3 can be non-orthogonal. As long as the plane constituted by the second axial direction A2 and the third axial direction A3 is generally perpendicular to the first axial direction A1, the adjustable printing-height three-dimensional printer 1 of the disclosure can perform three-dimensional printing. Further, the two-dimensional moving module 16 includes a first rail 160 and a second rail 161. The first rail 160 is operably engaged with the nozzle bracket 13 and extends generally along the second axial direction A2. The second rail 161 has ends which are slidably disposed on the first rail 160 and extends generally along the third axial direction A3. The printing nozzle 14 is slidably disposed on the second rail 161. The two-dimensional moving module 16 further includes a first transmission member 162, a first motor 163, a second transmission member 164, and a second motor 165. The first transmission member 162 is operably engaged with the second rail 161, for example being connected or detachably coupled with the second rail 161. The first motor 163 is disposed on the first rail 160 and configured to drive the first transmission member 162 to move the second rail 161 relative to the first rail 160 generally along the second axial direction A2. The second transmission member 164 is operably engaged with the printing nozzle 14, for example being connected or detachably coupled with the printing nozzle 14. The second motor 165 is disposed on the second rail 161 and configured to drive the second transmission member 164 to move the printing nozzle 14 relative to the second rail 161 generally along the third axial direction A3.

In the embodiment, the first transmission member 162 and the second transmission member 164 are shown as transmission belts or step belts, but the disclosure is not limited in this regard. For example, it is envisaged that other movable mechanical or pneumatic arrangements known by skilled persons in the art may be employed.

As described in the foregoing configuration, the adjustable printing-height three-dimensional printer 1 of the disclosure can adjust the movement of the nozzle bracket 13 relative to the working platform 12 in the first axial direction A1 by driving the first screw rod 111 to rotate using the first driver 15, and can respectively adjust the movements of the printing nozzle 14 in the second axial direction A2 and the third axial direction A3 by respectively using the first motor 163 and the second motor 165, so as to achieve the printing of a three dimensional object 2.

Figure 2:
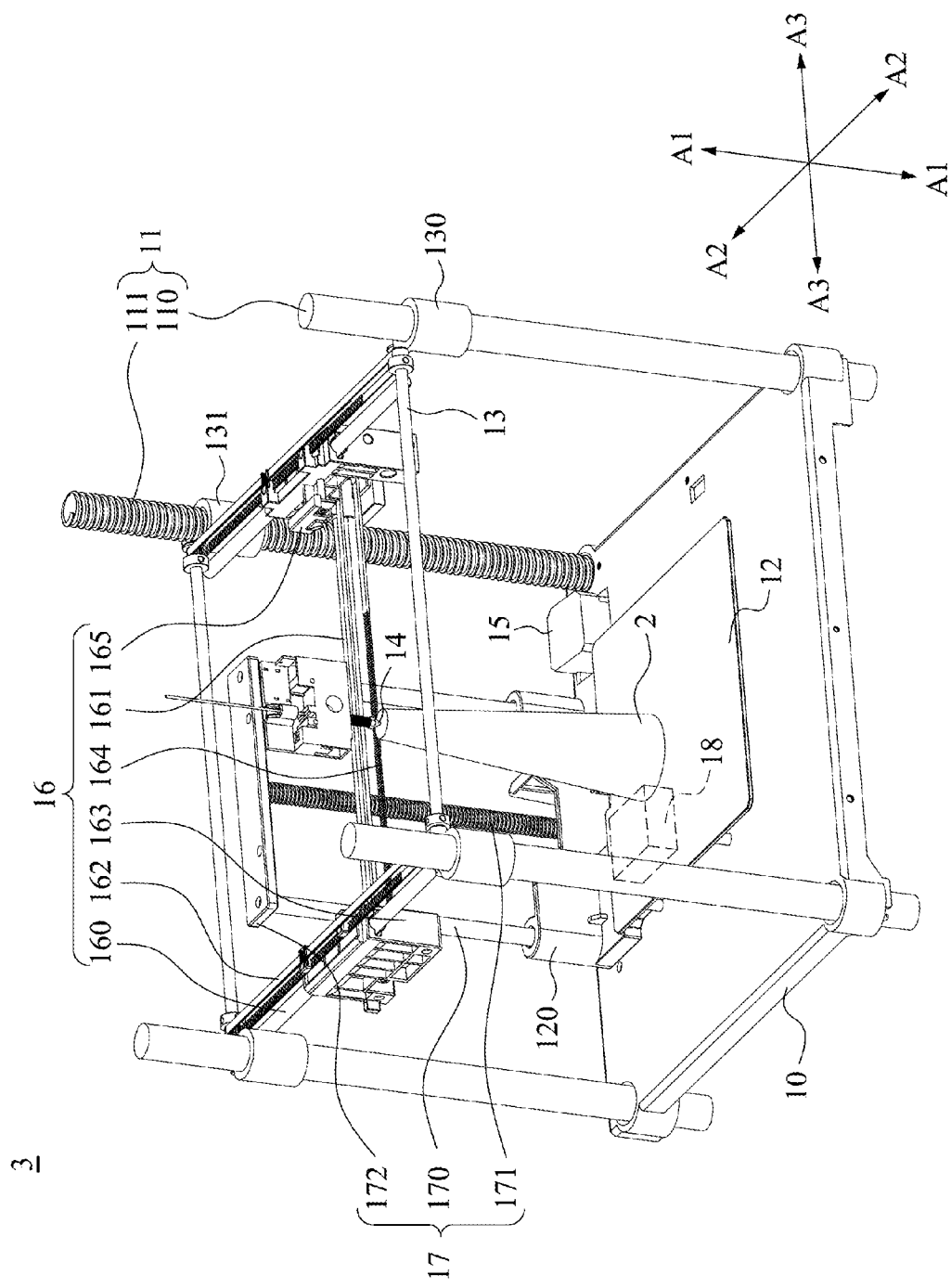
FIG. 2 is a perspective view of an adjustable printing-height three-dimensional printer according to another embodiment of the disclosure.

Referring to FIG. 2, in this alternative embodiment, the adjustable printing-height three-dimensional printer 3 also includes the base 10, the first elevating module 11, the working platform 12, the nozzle bracket 13, the printing nozzle 14, the first driver 15, and the two-dimensional moving module 16. Therefore, the structures, functions, and operating principles of the foregoing components and the operational relationships among the components can be referred to the above descriptions discussed above and are not repeated here to avoid duplicity. Compared with the adjustable printing-height three-dimensional printer 1 shown in FIG. 1A, the adjustable printing-height three-dimensional printer 3 of the embodiment shown in FIG. 2 further includes a second elevating module 17 and a second driver 18 (shown in dotted line in FIG. 2). The second elevating module 17 is disposed on the base 10 and operably engaged with the working platform 12, for example being connected or affixed or locked to the working platform 12. The working platform 12 may separate from the base 10 and the second elevating module 17 engages the working platform 12 such that it allows the second elevating module 17 to cause or control movement of the working platform 12. The second driver 18 is configured to drive the second elevating module 17 to move the working platform 12 between the base 10 and the printing nozzle 14 along the first axial direction A1 (vertically).

In the embodiment, the second elevating module 17 includes a second guide rod 170 and a second screw rod 171. The second guide rod 170 is disposed on the base 10 and slidably engaged with the working platform 12. The second guide rod 170 extends generally along the first axial direction A1 vertical from the base 10. Specifically, the working platform 12 includes a sleeve 120. The second guide rod 170 is slidably sleeved by the sleeve 120. The second screw rod 171 is disposed on the base 10 and in a screwing arrangement with the working platform 12. For example, the second screw rod 171 has a spiral groove coupling with a counterpart located on the working platform 12. The second driver 18 drives the second screw rod 171 to rotate, so as to move the working platform 12 along the first axial direction A1.

In the embodiment, the adjustable printing-height three-dimensional printer 3 includes two pairs of the sleeve 120 and the second guide rod 170, which can better maintain the horizontal level of the working platform 12 while raising or lowering the working platform 12 relative to the base 10. However, the number of pairs of the sleeve 120 and the second guide rod 170 is not limited in this regard.

Furthermore, the second elevating module 17 further includes a spacer 172. The second guide rod 170 is operably engaged with the spacer 172. As shown in FIG. 2, the nozzle bracket 13 and the working platform 12 are respectively located at opposite sides of the spacer 172, and the spacer 172 is located in the moving path of the nozzle bracket 13. That is, the first driver 15 can make the nozzle bracket 13 move at a side of the spacer 172 by the first screw rod 111, and the second driver 18 can make the working platform 12 to move at another side of the spacer 172 by the second screw rod 171. When the first elevating module 11 moves the nozzle bracket 13 to abut against the spacer 172, the nozzle bracket 13 is located at its lowest height position. When the first elevating module 11 moves the nozzle bracket 13 to its farthest position relative to the spacer 172, the nozzle bracket 13 is located at its uppermost height position.

With the structural configuration, when there is no object to be printed or the height of the object 2 to be printed is small, the adjustable printing-height three-dimensional printer 3 of the disclosure can move the nozzle bracket 13 to its lowest height position, so that the adjustable printing-height three-dimensional printer 3 occupies less space. Meanwhile, the second driver 18 can drive the second elevating module 17 to move the working platform 12 to the height at which the printing nozzle 14 prints the first layer of the object 2, and the working platform 12 is gradually lowered (for example, moving a distance equal to the thickness of a single printing layer) to gradually complete the printing of the object 2. Alternatively, if the height of the object 2 to be printed is large, the adjustable printing-height three-dimensional printer 3 of the disclosure, by the first elevating module 11, can move the nozzle bracket 13 from the lowest height to its uppermost height (for example, moving a distance equal to the thickness of a single printing layer). With this setting, the working platform 12 is located at its lowest position, and can increase the movable height range between the printing nozzle 14 and the working platform 12. Using different operating modes, the adjustable printing-height three-dimensional printer 3 of the disclosure can reduce its volume space for most of the time, and the volume space can be expanded to cater for printing objects which have a larger height dimension.

Figure 3:
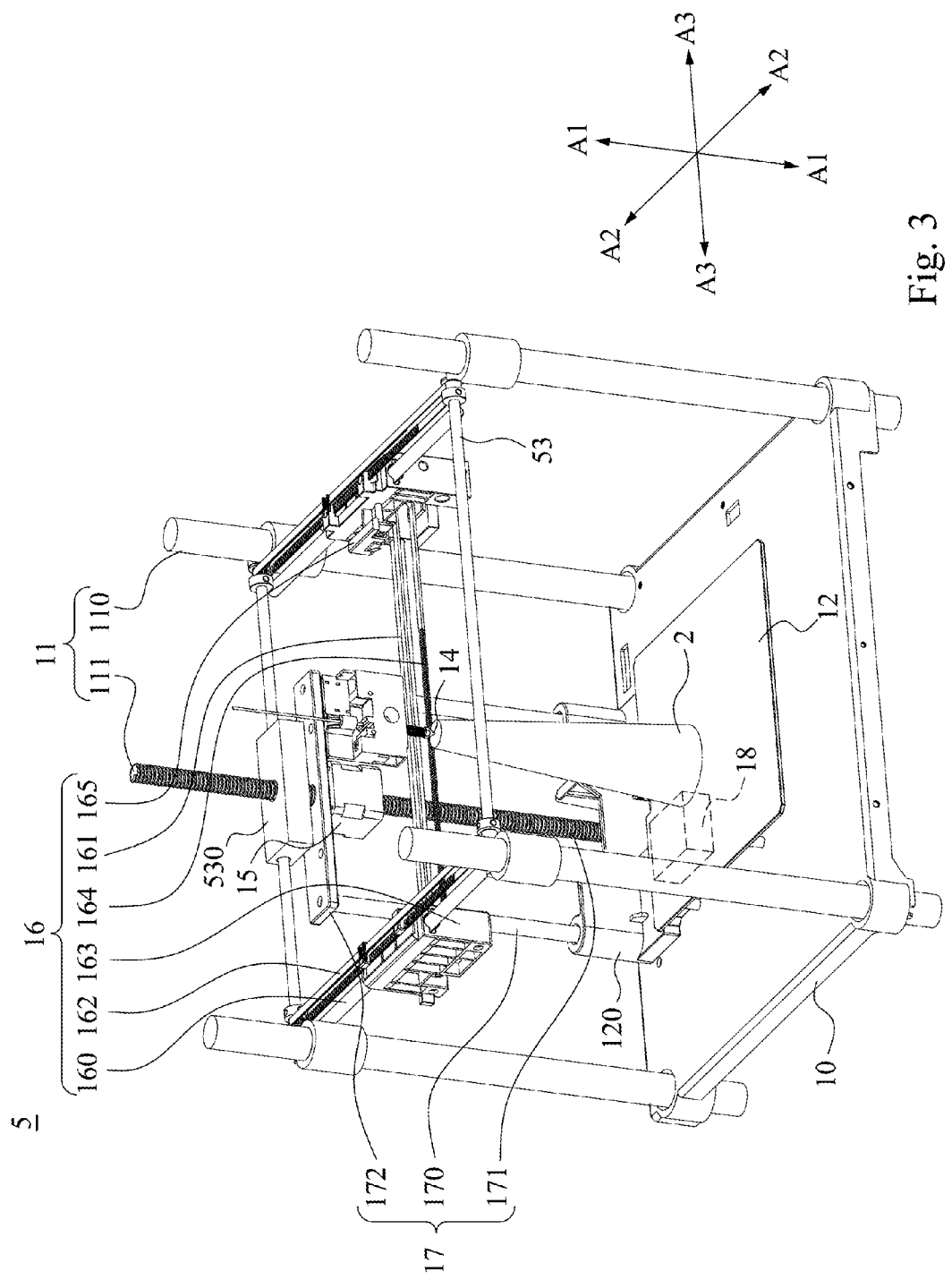
FIG. 3 is a perspective view of an adjustable printing-height three-dimensional printer according to another embodiment of the disclosure.

FIG. 3 is a perspective view of an adjustable printing-height three-dimensional printer 5 according to another embodiment of the disclosure. As shown in FIG. 3, in the embodiment, the adjustable printing-height three-dimensional printer 5 also includes the base 10, the first elevating module 11, the working platform 12, the nozzle bracket 53, the printing nozzle 14, the first driver 15, the two-dimensional moving module 16, the second elevating module 17, and the second driver 18. Therefore, the structures, functions, and operating principles of the foregoing components and the relationships between the components discussed above are relevant and are not repeated here to avoid duplicity. Compared with the adjustable printing-height three-dimensional printer 3 in FIG. 2, the first driver 15 of the adjustable printing-height three-dimensional printer 5 of the present embodiment is disposed on the spacer 172 of the second elevating module 17. Moreover, the first screw rod 111 extends away from the base 10 to the spacer 172 and engages in a screw arrangement with a counterpart screw-receiving portion 530 of the nozzle bracket 53. The second screw rod 171 extends between the base 10 and the spacer 172. Under the configuration, the nozzle bracket 53 can also be moved to its lowest height (i.e., the nozzle bracket 53 is moved to abut against the spacer 172) or to its uppermost height (i.e., the nozzle bracket 53 is moved to its farthest position relative to the spacer 172) by the first elevating module 11. In this embodiment, the length of the first screw rod 111 can be significantly shortened.

Similarly, this embodiment also has advantages of compactness and ease of operational use as for the previously described embodiments.

Although the present disclosure has been described in detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An adjustable printing-height three-dimensional printer, comprising:
   a base;
   a first elevating module disposed on the base;
   a working platform located proximal to the base;
   a nozzle bracket operably engaged with the first elevating module;
   a printing nozzle operably engaged with the nozzle bracket and configured to print on the working platform;
   a second elevating module disposed on the base and connected to the working platform, the second elevating module comprising a spacer, wherein the nozzle bracket and the working platform are located at opposite sides of the spacer;
   a first driver configured to drive the first elevating module to move the nozzle bracket relative to the spacer at one of the sides of the spacer along a first axial direction, so as to make the printing nozzle move toward or away from the working platform; and
   a second driver configured to drive the second elevating module to move the working platform between the base and the printing nozzle and at another of the sides of the spacer along the first axial direction, such that the working platform moves between the base and the spacer.

2. The adjustable printing-height three-dimensional printer of claim 1, wherein the first driver is disposed on the base, and the first elevating module comprises:
   a first guide rod disposed on the base and slidably engaged with the nozzle bracket, wherein the first guide rod extends along the first axial direction; and
   a first screw rod disposed on the base and engaged in a screw arrangement with the nozzle bracket, wherein the first driver drives the first screw rod to rotate, so as to move the nozzle bracket along the first axial direction.

3. The adjustable printing-height three-dimensional printer of claim 1, wherein the second elevating module comprises:
   a second guide rod disposed on the base and slidably engaged with the working platform, wherein the second guide rod extends along the first axial direction; and
   a second screw rod disposed on the base and engaged in a screw arrangement with the working platform, wherein the second driver drives the second screw rod to rotate, so as to move the working platform along the first axial direction.

4. The adjustable printing-height three-dimensional printer of claim 3, wherein the second guide rod is operably engaged with the spacer, and the first driver is disposed on the spacer.

5. The adjustable printing-height three-dimensional printer of claim 4, wherein the first screw rod extends away from the base to a side of the spacer, and the second screw rod extends between the base and the spacer.

6. The adjustable printing-height three-dimensional printer of claim 1, further comprising a two-dimensional moving module operably engaged with the nozzle bracket and the printing nozzle, the two-dimensional moving module being configured to move the printing nozzle relative to the nozzle bracket along a second axial direction and a third axial direction.

7. The adjustable printing-height three-dimensional printer of claim 6, wherein the two-dimensional moving module comprises:
   a first rail operably engaged with the nozzle bracket and extending along the second axial direction; and
   a second rail slidably disposed on the first rail and extending along the third axial direction, wherein the printing nozzle is slidably disposed on the second rail.

8. The adjustable printing-height three-dimensional printer of claim 7, wherein the two-dimensional moving module further comprises:
   a first transmission member operably engaged with the second rail;
   a first motor disposed on the first rail and configured to drive the first transmission member to move the second rail relative to the first rail along the second axial direction;
   a second transmission member operably engaged with the printing nozzle; and
   a second motor disposed on the second rail and configured to drive the second transmission member to move the printing nozzle relative to the second rail along the third axial direction.

9. The adjustable printing-height three-dimensional printer of claim 8, wherein the first transmission member and the second transmission member are transmission belts.

10. The adjustable printing-height three-dimensional printer of claim 6, wherein any two of the first axial direction, the second axial direction, and the third axial direction are orthogonal to each other.

* * * * *